United States Patent

Rouse

[11] Patent Number: 5,860,066
[45] Date of Patent: Jan. 12, 1999

[54] IMAGING AND WORKFLOW SYSTEM

[75] Inventor: Lonnie D. Rouse, Largo, Fla.

[73] Assignee: Payment Systems for Credit Unions Inc., St. Petersburg, Fla.

[21] Appl. No.: 671,220

[22] Filed: Jun. 27, 1996

[51] Int. Cl.$^6$ .................................................. G06F 17/40

[52] U.S. Cl. ............................................. 705/1; 707/500

[58] Field of Search .................. 707/500, 7; 364/478.01, 364/478.02, 478.03; 705/1–2, 7, 9; 706/45; 345/326

[56] References Cited

U.S. PATENT DOCUMENTS

| | | | |
|---|---|---|---|
| 5,182,705 | 1/1993 | Barr et al. ................................. | 705/11 |
| 5,307,262 | 4/1994 | Entel ........................................... | 705/2 |
| 5,319,543 | 6/1994 | Cuilhelm ..................................... | 705/3 |
| 5,344,132 | 9/1994 | LeBrun et al. ............................. | 271/35 |
| 5,557,515 | 9/1996 | Abbruzzese et al. ...................... | 705/7 |
| 5,602,936 | 2/1997 | Green et al. ............................... | 382/140 |
| 5,625,465 | 4/1997 | Lech et al. ................................. | 358/448 |
| 5,659,746 | 8/1997 | Bankent et al. ........................... | 707/205 |
| 5,666,490 | 9/1997 | Gillings et al. ........................... | 395/200.68 |

OTHER PUBLICATIONS

*Visual WorkFlo–13 Perspectives*, FileNet Corporation, 1995.

*FileNet Visual WorkFlo Software—Intelligent Work Management*, FileNet Corporation, 1994.

*Primary Examiner*—Joseph H. Feild
*Attorney, Agent, or Firm*—Roberts & Brownell LLC

[57] ABSTRACT

An imaging and workflow method, and a system for processing information efficiently for a service industry, the system being particularly well suited for use in the cardholder service industry. The system includes support for document scanning, automated rules-based workcase processing, statistical reporting, document generation and document storage and retrieval. This method and system takes advantage of imaging technology to assist the user in scanning information into the system and software modules to improve the processing of workcases. The system also includes a database table that identifies to application processing logic the types and sequences of actions to be implemented for defined workcase types. The computer program utilized by the system is modularized in order to facilitate adding new functions into the system. These new functions are supported through entries in the database tables.

16 Claims, 7 Drawing Sheets

IMAGING AND WORKFLOW SYSTEM

FIELD OF THE INVENTION

This invention relates generally to an image and workflow system for processing workcases in the service industry. In particular, the present invention relates to a system for processing workcases in the cardholder service industry.

BACKGROUND OF THE INVENTION

In the cardholder service industry, there exists a need to improve the quality and efficiency of processing workcase information such as customer complaints, customer billing, and payment processing. In this industry, the service provider must handle a great number of inquiries. Service representatives receive requests for information over the telephone and through the mail. The service provider also receives information, letters of complaint, and payment checks from cardholders. A central department of the service provider may also receive billing data and credit charges from other departments. All of this workcase information, which can be quite substantial in volume, must be processed by the service provider.

Currently, the service industry does much of the workcase information processing manually. The different types of incoming mail such as checks or letters of complaint are currently separated manually. Manual labor is then used to enter most of the data into a database, and to store the original copies of the data in a folder containing other documents with customer information. Often, these files are stored on microfiche and are not easily retrievable from storage. Retrieving files from storage can increase the time needed for a service representative to complete processing a workcase. In addition, statistics on the type of workcases that the representative processes are not easily obtainable in a manual processing system.

Automation and utilization of digital storage and retrieval technology would make workcase information processing much more efficient. An improvement upon the current system would provide cardholder services with a system that includes support for document scanning, automated rules-based workcase processing, statistical reporting, document generation, and document archival and retrieval capabilities.

SUMMARY OF THE INVENTION

It is therefore an objective of the present invention to improve response times to service requests, correspondence, and disputes, and to improve security and telephone services such as credit line increases and credit application acceptance procedures.

It is an additional objective of the present invention to provide improved management of workcase information distribution, processing, and status.

It is a further objective of the present invention to be able to add new functions to expand cardholder services or to adapt to changes in regulations without changing the main decision logic of the application.

It is also an objective of the present invention to provide a system that will increase the number of workcases answered and completed by cardholder service representatives in the correspondence, disputes, and telephone services areas.

It is still another objective of the present invention to use a computerized system to produce management reports and workcase statistics.

It is yet a further objective of the present invention to replace document storage on microfiche with digital storage of cardholder documentation.

It is an additional objective of the present invention to decrease reliance on paper files and manual document transmittal methods.

It is another objective of the present invention to integrate the Facsimile, MasterCom, and VisaNet interfaces in a cardholder workflow system to validate receipt of faxes and electronically-transmitted sales drafts and to tie these items to open workcases.

It is still a further objective of the present invention to provide cardholder service representatives with a Windows-based single-point user interface to local applications and with access to external systems and networks.

These and other objects and advantages of the present invention will be apparent to those of ordinary skill in the art upon inspection of the detailed description, drawings, and appended claims.

The present invention is an imaging and workflow system to be used by the service industry. The system is of particular utility to the cardholder service industry. The system utilizes a data processor having application processing logic and peripherals to perform the workflow tasks. Paper documents are captured, stored, and manipulated digitally for more efficient and economical processing. Hard copies may later be printed on command or automatically, and can be automatically processed for mailing or facsimile transmission.

The present invention uses imaging technology to improve the quality and speed up the processing time of workcase information. The automated imaging environment of the present invention ensures timely and accurate handling of workcases, workcase review, and reprioritization, and also easier retrieval of complete workcase documentation. Flexible and configurable rules-based workcase processing reduces overall workcase processing time, write-offs, and personnel training expenses. Manual labor is only used to separate the different types of data received through the mail.

A scanner is used to read the information received through the mail into a computer file, and a laser disk is used to store a permanent copy of the likeness of the data. This means of storing the information creates a permanent copy of the information that is easily retrievable, preferably through user-friendly screens. Using the present invention, information is accessible not only to customer service representatives but also to other corporate departments.

Database parameters are manually keyed into a record and are used to index the different types of incoming information to facilitate sorting the different types of data. Different parameters are used to distinguish the different types of data. For example, billing data is distinguished from customer complaints. Items such as credit charges that are received through electronic means are also indexed by the data processor.

Other features of the system include database tables which identify to the application processing logic the types and sequences of actions to implement for defined workcase types. In certain cases, these sequences are performed automatically. Management reports are also generated that can track the productivity, quality, and performance at the customer service representative level and the managerial level. Local applications of the system include word processing applications for documentation or letters of correspondence. New functions can also be added, including changes in workcase processing rules mandated by credit card, government, and credit union authorities. The computer program utilized by the system is modularized in order to facilitate adding new functions into the system. These new functions are supported through entries in the database tables.

DETAILED DESCRIPTION OF THE INVENTION

The five major functions performed by the Imaging and Workflow System are 1) document preprocessing, 2) rules-based workcase processing, 3) individual user functions, 4) batch processing, and 5) output document processing.

1. Document Preprocessing

Figure 1:
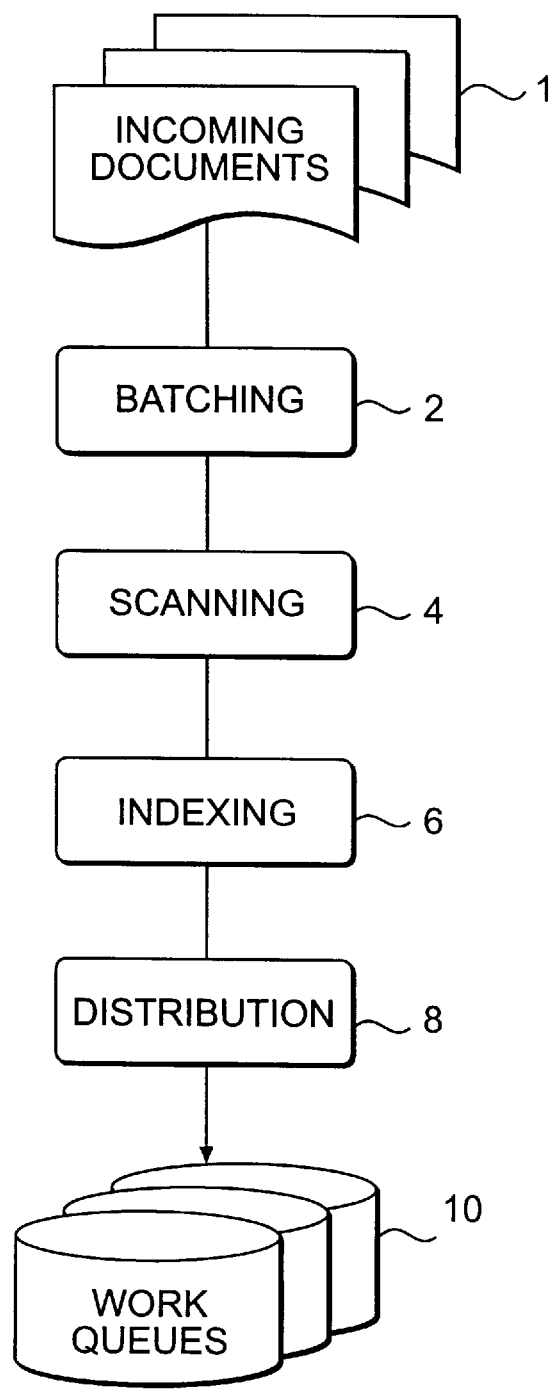
FIG. 1 shows the flow of preprocessing functions for incoming documents.

FIG. 1, the Document Preprocessing diagram, shows the flow of preprocessing functions for incoming documents 1, from the receipt of the document to the distribution of the documents to system work queues. The document preprocessing function prepares incoming documents 1 for workcase processing. Those activities include batching 2, scanning 4, indexing 6, and distribution 8 of data to work queues 10. Batching 2 includes the manual process of reading incoming documents 1, classifying like workcases, and grouping these like workcases. For example, documents related to address changes would be grouped into one batch. A batch header sheet is prepared to accompany each batch. Batch header sheet information may include the date of receipt, workcase type, number of documents in the batch, number of pages in the batch, identification information of the person responsible for batching the group of documents, any special instructions, scanner ID, batch ID, and the date the documents were scanned. The batched documents are then passed to the scanning operator for entry into the system.

Scanning 4 includes the process of submitting batched documents to the system scanner device, which digitizes and queues the scanned images for later indexing and storage to optical disk. At an imaging system workstation, the user enters data about the batch to be scanned, such as the receive date, workcase type, number of documents, and number of pages. The scanner application can accept and validate the user's batch information data entries. The scan application enables the user to set various scanning quality parameters, such as document paper size and quality, image density, and rotation. The user can start and stop the scanning process, accept or reject the scanned pages, and indicate the end of scanning for the batch. The application checks whether the number of scanned images matches the value entered for the number of pages in the batch and displays these verification results. The scan application prompts the user to either accept or delete the batch. The application also updates the scan statistics file with the scan statistics for the batch. If the scan counts match or the user accepts the batch, the scan application puts the digitized images in a scan queue, which provides the input for the indexing 6 process.

Figure 2:
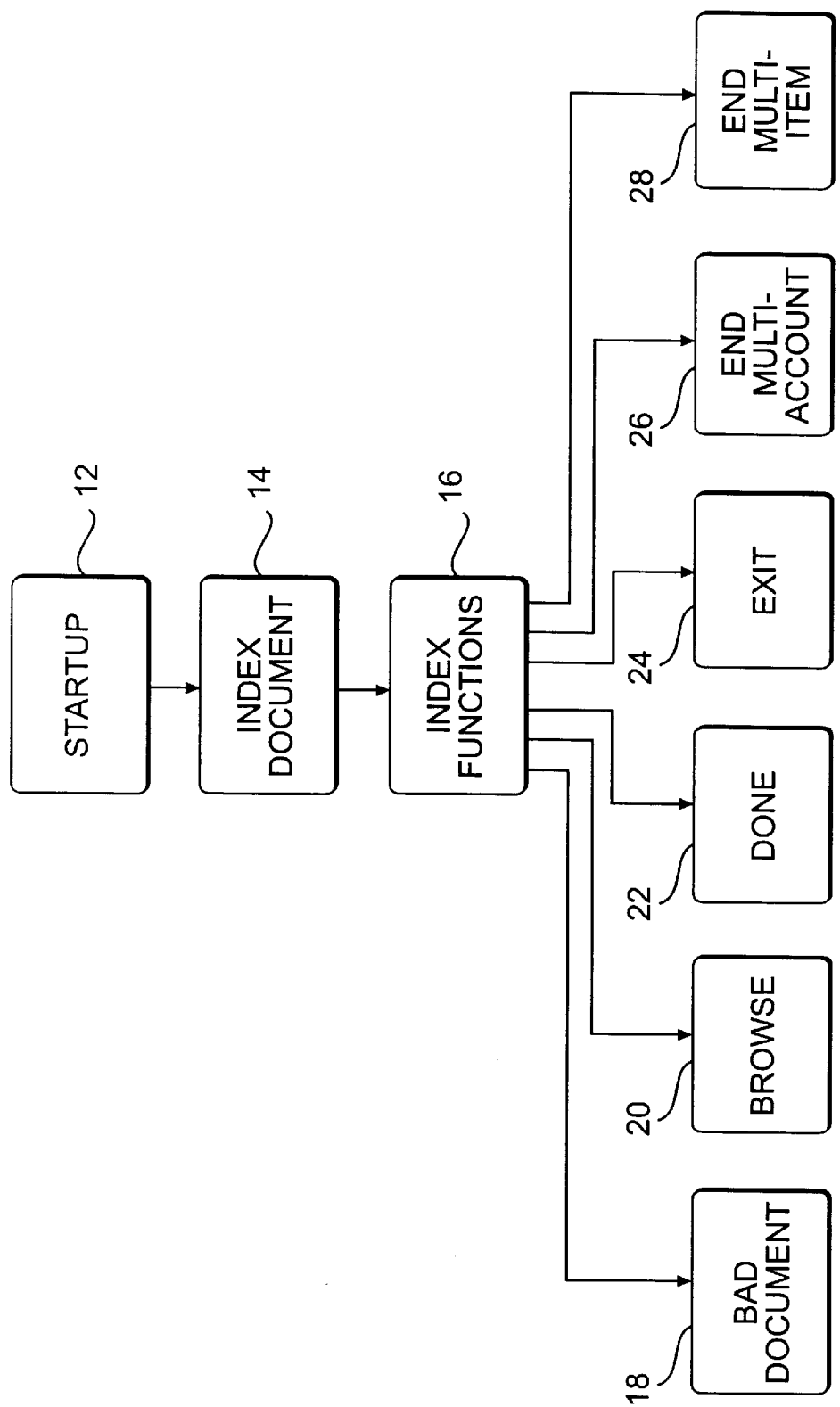
FIG. 2 shows the Indexing Module functions.

FIG. 2, the Indexing Functions diagram, shows the Indexing Module Functions. Indexing 6 involves assigning various indexes to each scanned document to enable the linking of all documents belonging to the same workcase. Depending on the particular workcase type, the user enters the required information in the indexing fields and validates index entries according to the value of a system parameter.

A Startup module 12 is invoked when the user logs on to the system. After the user successfully logs on the system, the module retrieves and displays the first document from a user-selected batch type in the Scanned queue. The module then displays the Index Form 14, which shows the indexing function 16 menubar and screen fields for entering indexing information. Options available to the representative from the menu during the Indexing process are Bad Scan 18, Page Back, Page Forward, Process, and Exit. The functions of each of these additional options are discussed in the description of FIG. 3.

Figure 3:
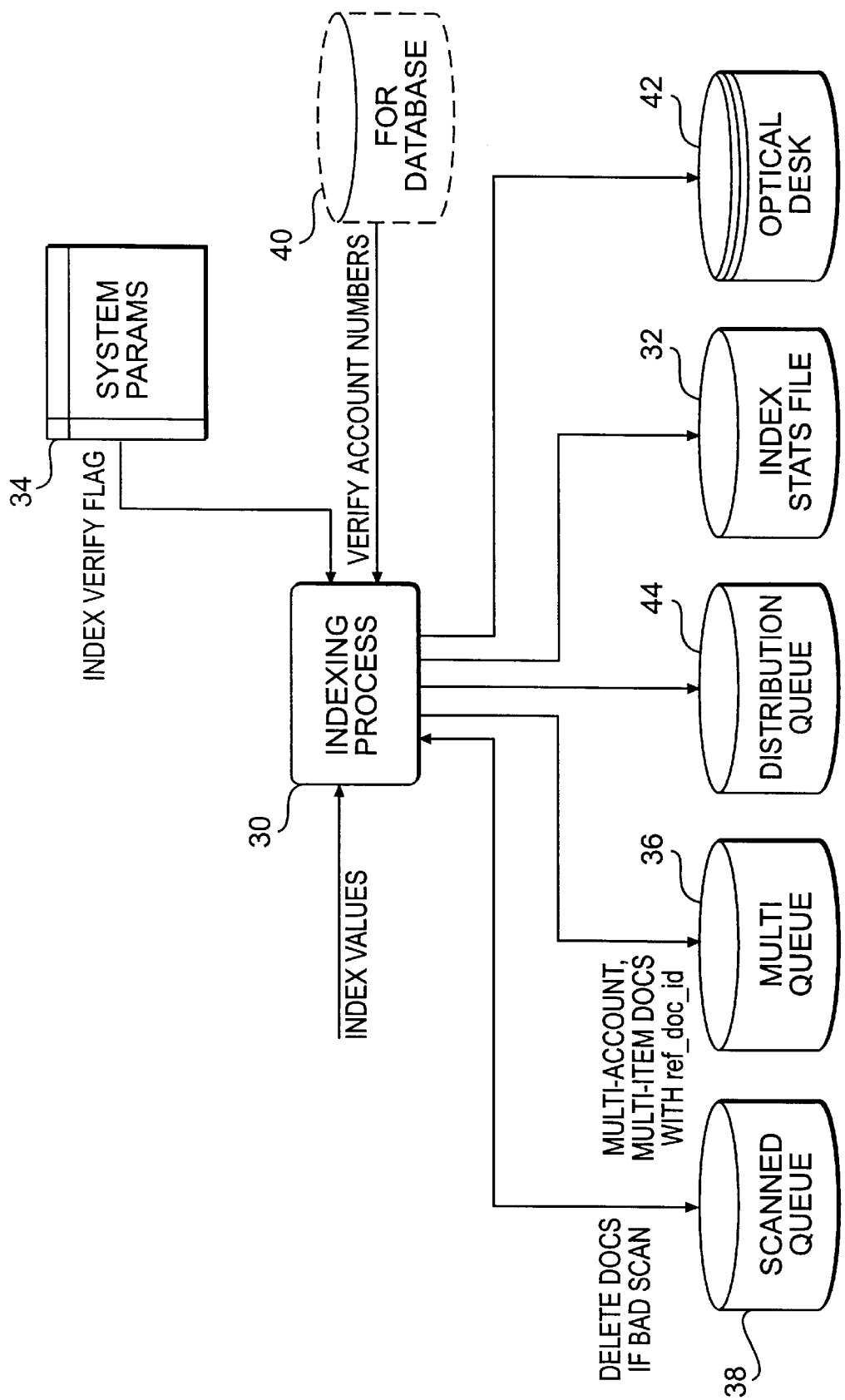
FIG. 3 shows the process of indexing documents.

FIG. 3, the Indexing Process diagram, shows the system process for indexing documents in more detail. The user provides the following items of information 30 on the Index Form: Cardholder Account Number (required), Document Type, Posting Date, Receive Date (required), Transaction Amount, and Workcase Type (required). The Index module then performs the following tasks:

populates the required fields of the Index form with the Receive date accepts the user's data entries and stores the indexing data for each document in the batch prompts the user to enter index data correctly twice in succession if the system parameter flag for index verification is set 34 creates multiple records in the indexing database for the same document if the user selects the Multi button. The process stores each instance of indexing on the document. When the user selects the End Multi button, the process commits one of the sets of indexes to the indexing database and the system generates a reference document ID for the committed image. For each other instance of indexing on the document, the process creates a dummy document that is based on the reference document ID of the committed image. Dummy documents are blank images that refer to a committed document image. Because the information in the indexing database for each dummy document includes the reference document ID of the committed image on which the dummy is based, the system will always display the image associated with the reference document ID, and not the blank image associated with the dummy document's ID;

accepts multiple workcase type index values for the same document if the user sets the Multiple Item indicator. This action implies that the document being indexed applies to either more than one instance of the same type of workcase or to several different workcase types for the same account number. The process creates as many index records for the document as required, with each index record referencing the same document ID.

The Bad Document option 18 rejects an unacceptable image of a scanned document. This option performs the following:

prompts the user to confirm the delete request;

prints a page that identifies the sequence number of the document within the batch and the batch ID number;

updates the Scan Statistics file records for the scanner's user ID; and deletes 38 the document from the batch.

The Browse option 20 enables the user to view additional pages in the displayed document. The option includes a pull-down menu with selections that enable forward and backward paging through the document's pages.

The Process option 22 ends indexing on the displayed document. This option performs the following functions:

performs a check digit (modulus 10) test;

if the test fails, the program checks whether a mod 10 test failure is permitted for the particular workcase type;

if mod 10 failure is permitted, processing continues by validating the account number with the host database; and if mod 10 failure is not permitted, the user is prompted to re-enter the account number.

If the account number fails the validation test against the host database, the module prompts the user to re-enter the account number.

The Exit 24 function ends a document indexing session. The function:

closes the Index Form window, logs the user off the database and the image management services server, and returns the user to Windows.

The End Multi option 26 ends indexing on a document that is associated with multiple sets of index values. This option performs the following functions:

clears the Multiple Flag; and displays the next document to be indexed in the batch or performs the same tasks as those noted for the Process option if all documents in the batch have been indexed.

2. Rules-based Workcase Processing

Figure 4:
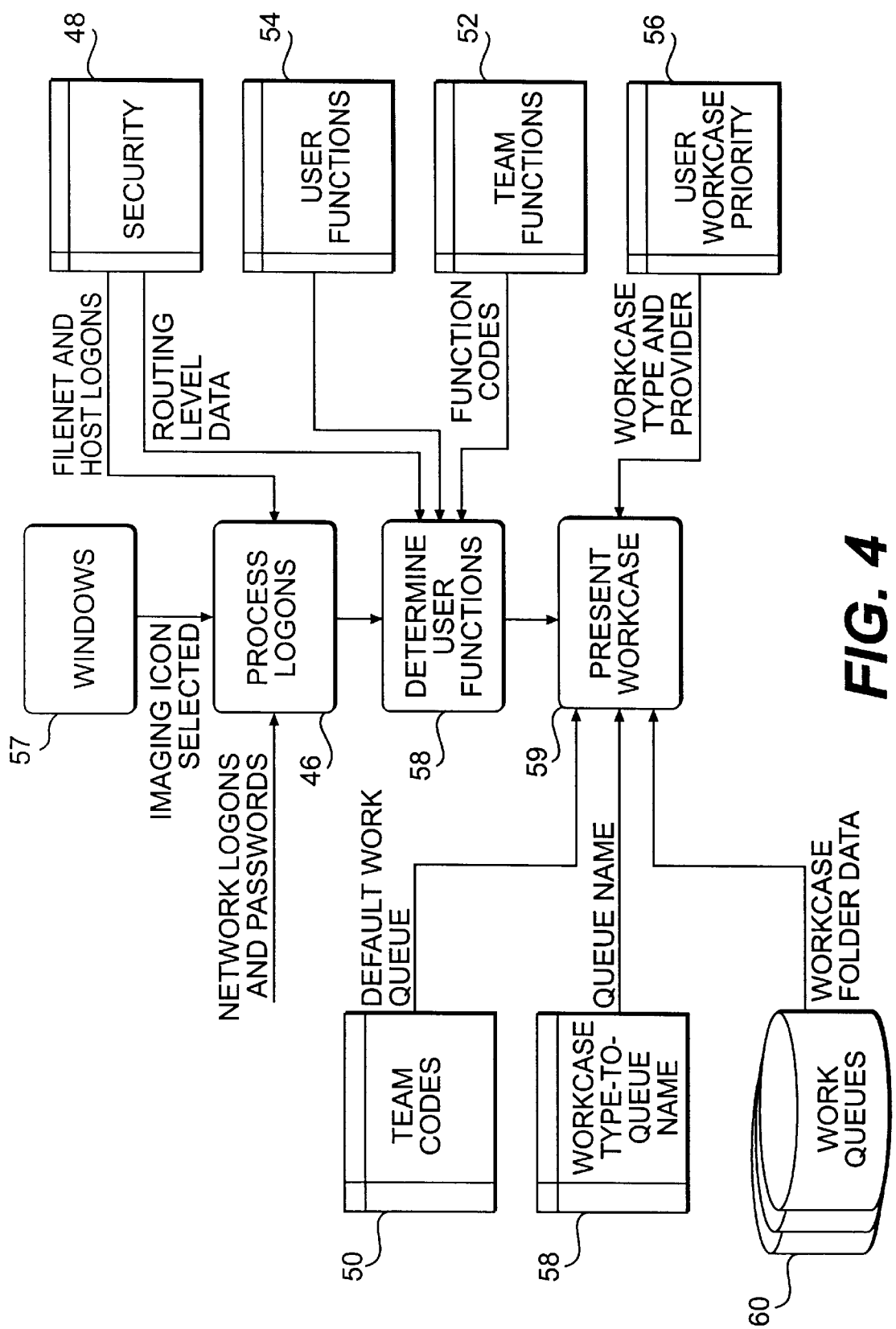
FIG. 4 shows the process and data flow that occurs when a user accesses the workcase processing environment of the system.
Figure 4A:
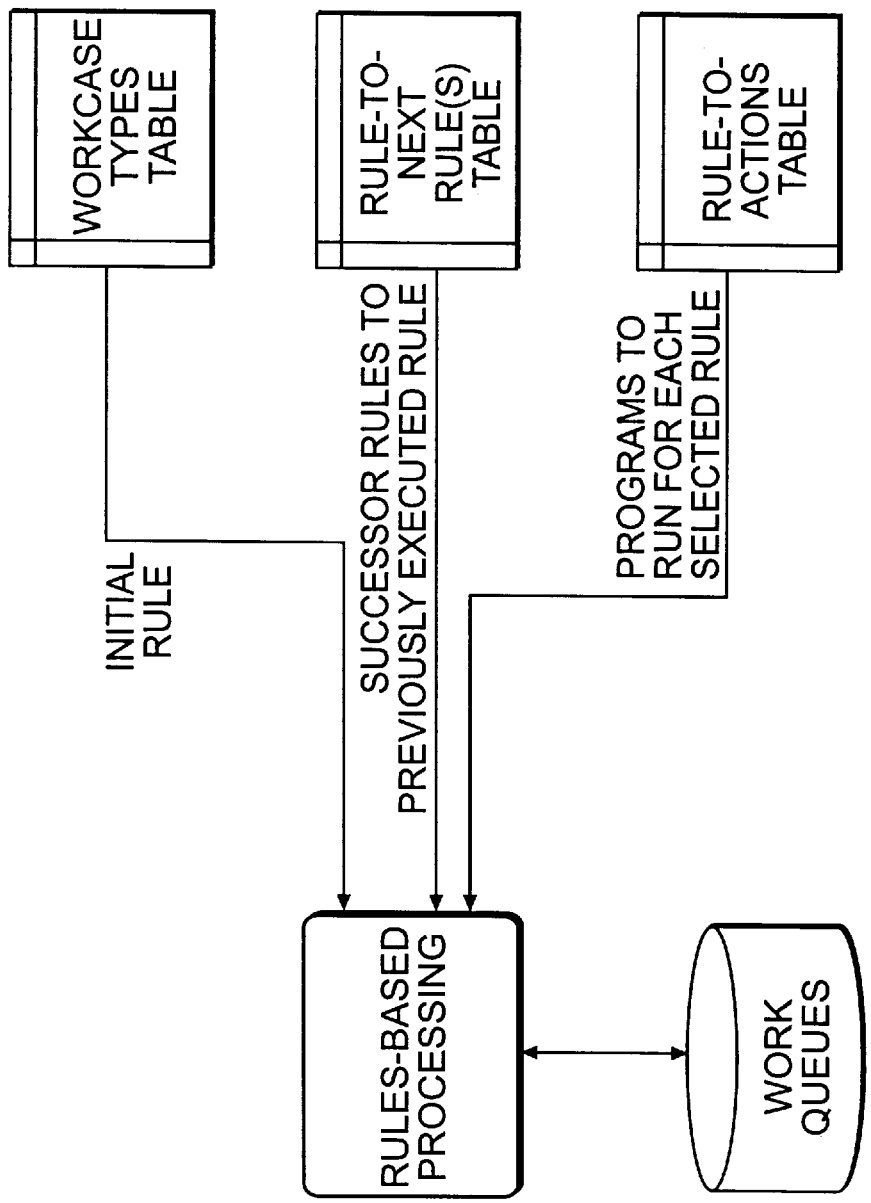
FIG. 4A shows an overview of rules-based workcase processing.

FIG. 4A shows an overview of rules-based workcase processing. According to the rules-based processing of the present invention, the system automatically performs a sequence of pre-defined actions to process a given type of workcase from either a newly opened or a pended state, to another pended state or a closed state.

The individual actions needed to transition a workcase from state to state are performed automatically when the user selects a "rule" from a list of rules that are appropriate for the workcase and its current state. The selection of a rule results in the automatic execution of a sequence of actions that define the rule. Completion of processing for a selected rule results in the workcase being placed in either a pended or closed state. The rules applicable to a given workcase type and the actions associated with each rule are defined in configurable database tables, as indicated in FIG. 4A.

The number of rules that must be ultimately selected to process a workcase from an open to a resolved (closed) state will vary depending on the processing required for the workcase type. Routine workcases may require the selection of only a single rule to completely process and resolve the workcase; other workcases will require the selection of two or more rules over the life of the workcase. In any case, rules-based processing automates the numerous actions that must occur during workcase processing.

Rules-based workcase processing is accomplished through a set of tables that define the actions the application initiates for a given workcase type and credit union prefix. Support for rules-based workcase processing derives from changes and additions to parameterized table structures referenced by the application and from the addition of special processing support modules and utilities routines. Processing actions and sequences can be maintained with no changes required to the main processing control logic of the application.

3. Individual User Functions

FIG. 4, the Image and Workflow System Startup diagram, shows the process and data flow that occurs when a user accesses the workcase processing environment of the system 57. The Image Startup module invokes the log-on sequence 46.

After the user logs on, the Image Startup module reads several security-related reference tables 48 to determine the user functions 58 available for the user and the scope of the user's workcase routing capabilities. The module:

reads the Security table 48 to get the codes that identify the user's team, user's routing level, and the highest level user to which the user is permitted to route a workcase; and reads the Team Functions table 52 for the user's team code and gets all the function codes defined for the user's team. The module also reads the User Functions table 54 for any function codes that need to be either added to or deleted from the set of team function codes provided to the user.

The Imaging Startup module also determines which workcase to present 59 to the user. The process also performs the following:

reads the User Workcase Priority table 56 for the user's ID to determine whether particular workcase types have higher priority for the user over other workcase types;

reads a Team Code table 50 that identifies the default work queue to which the user is assigned; and reads the appropriate work queue 58 and displays the first document 60 image from the highest priority workcase folder for the user.

The User Functions module 54 contains the user-initiated workcase processing functions supported in the application. User functions 54 available to representatives include Browse, Close, Cold, Exit, Initiate Workcase, Initiate Workcase from Unmatch, PC Actions, Pend, Print/Fax, Local Query, Reindex, and Route. User functions 54 available to supervisory level users are provided in Administrative functions, which include Reassign, Browse Queue, Document Move, Global Query, Retrieve Archives, Revise Target Date, Work Unmatched Queue, and End Work Unmatch Queue.

The Browse function 20 enables the user to view documents within the folder for the displayed workcase. The function performs the following tasks:

displays a list of document IDs and document types in the folder;

displays the previous page or document in the folder;

displays the next page or document in the folder; and displays the first and last pages or documents in the folder.

The Close function performs the following tasks:

checks if any pend dates remain outstanding for the workcase—a workcase cannot be closed if it has an outstanding pend date;

determines whether to write the workcase to a special quality assurance queue for review based on the value of a configurable system parameter;

updates the record for the workcase in the Location queue to indicate the date the case was closed, and, if necessary to indicate the movement of the workcase to the quality assurance queue creates an Action queue record for the Close action; and updates the workcase processing statistics for the user.

The Cold (Computer output to laser disk) function enables a user to retrieve cardholder statement images stored on optical disk. The function:

accepts and validates the account number for which statement data is requested;

lists the available months of statements associated with the account number;

retrieves and displays the images of the selected statement months; and enables the user to print the specified statement images.

The Exit function 24 closes the most recently opened workcase window. Upon closing the last Workflow form, the Exit function:

tabulates and displays the daily processing statistics for the user;

closes all queues, files, and windows opened by the user; and terminates all the user's open communication sessions and returns the user to Windows.

The Initiate Workcase function creates a document to include in a new workcase folder. This function is intended for use primarily by telephone representatives for initiating workcases based on telephone requests from cardholders. The function performs the following tasks:

displays a screen form that accepts data from the user such as workcase type, cardholder account number, transaction amount, transaction posting date, receive date; and comments.

verifies cardholder account numbers within the database;

creates a document image from the completed form;

creates a record for the document in the Distribution queue to enable the Distribution process to create a workcase from the document.

The Initiate Workcase form Unmatch function enables the user to create a workcase from a document in the Unmatch queue. The Unmatch queue contains records for documents with indexes that match the indexes of more than one existing workcase. Because the distribution process cannot positively determine the workcase folder to file the document into, it files the document in the Unmatch queue for later review and disposition. When a user examines a document from the Unmatch queue and decides to force the creation of a workcase from the document, the function:

creates a Distribution queue record for the document with a special flag set to force the distribution process to create a workcase from the document;

deletes the document record from the Unmatch queue;

creates an appropriate record in the Action queue and the workcase processing statistics file for the user.

The PC products function accesses other local PC-based applications on the network, such as a word processing program. The function performs the following tasks if the word processing program is selected:

displays a pull-down menu;

opens the application selected and passes the cardholder account number, transaction amount, statement posting date, and receive date to the word processing program;

sends the completed letter to the Print Request queue when the user saves and closes the word processing document;

creates an image of the word processing document and adds the document ID to the imaging database record for the workcase folder;

closes the word processing application; and creates a record of the action in the Action queue and updates the workcase processing statistics for the user.

The Pend function pends a workcase for review at a later date, which is determined by adding a specified number of working or calendar days to the current system date. The function performs the following tasks:

displays a pop-up dialog box, listing valid pend reason codes and accepts the reason code for pending the case;

calculates the pend date based on the number of pend days for the pend action and whether the number of pend days represents working days, calendar days, or both, as indicated by the appropriate record in the Action/Pend Days table. The process also determines whether any of the dates in the pend period represent holidays and adjusts the pend date accordingly;

enters the pend date in the work queue record for the workcase;

creates a record in the Action queue to reflect the pend action on the workcase; and updates the workcase processing statistics for the user.

The Print function prints or faxes documents. When the user selects the Print function from the Print pull-down menu, the function:

displays a list of documents in the workcase with an option for selecting any or all documents;

displays the print options;

sends the user's print request containing the selected document(s) to the Print Request queue. The Print Request queue record includes the ID of the document to print, cardholder account number associated with the document, workcase type, representative user ID, print urgency (immediate or batch), and printer ID (if immediate print requested);

creates an Action queue record to reflect the print action on the workcase; and updates the workcase processing statistics for the user and the print statistics for the associated credit union prefix.

When the user selects the Fax option from the Print pull-down menu, the function:

displays a list of documents in the workcase with an option for selecting any or all documents;

reads the Fax Number table to retrieve and display the facsimile transmission ("fax") number for the credit union. If no record exists in the table for the fax number, the function prompts the user for a fax number;

displays a form that shows the "Fax To:" and "Fax From:" names, the number of pages to fax, and the fax options, which are initially populated with the default values. The fax can be sent during off-peak billing hours or regular business hours;

sends the user's fax request to the Fax Request queue. The Fax Request queue record includes: "Fax To" name, "Fax From" name, ID of the document to fax, cardholder account number associated with the document, workcase type, representative user ID, fax urgency (immediate or batch/off-peak), fax number, whether to include separate cover sheet or a memo line;

creates an Action queue record to reflect the fax action on the workcase; and updates the workcase processing statistics for the user and the fax statistics for the associated credit union prefix.

The Query function searches the work queue for a specific folder for an active workcase. The function:

displays a form for accepting query search criteria including cardholder account number, and ranges for transaction amount, transaction posting date, and receive date;

searches the work queue and lists the folders that match the search criteria;

displays the first document from the selected folder and enables the user to browse documents in the folder;

enables processing on the workcase if the user selects the "Work" option from the form; and exits the queried workcases and returns the user to the previously displayed workcase when the user selects the "Exit/Cancel" option.

The Reindex function changes the index values for a workcase. The function is implemented in two steps performed separately by a representative and a team leader. In the first step, the representative enters the new index values and routes the workcase to the Team Leader queue for approval of the index value changes. In the second step, the team leader either accepts the changes as entered by the representative, cancel the changes, or makes new changes. If the team leader cancels the reindexing request, the process reroutes the workcase back to the work queue. If the team leader accepts the indexes or enters new index values, the process sends the workcase to the weighting and Distribution processes, after which the workcase is routed back to a work queue.

The Reindex function at the representative level performs the following tasks:

accepts the user's new index values. The user can change the cardholder account number, transaction amount, statement posting date, receive date, and workcase type;

validates the cardholder account number within the database if the user changes the account number;

accepts a route reason code selected by the user from a pull-down list, appends the user's routing level to the selected route reason, and updates the Route/Reason Routing Level field in the work queue record;

routes the workcase from the work queue to the Team Leader queue and populates the Team Leader queue record with the new index values for the new cardholder number, new post date, new receive date, new transaction amount, and new workcase type;

updates the location queue record for the workcase to reflect the movement of the folder from the work queue to the Team Leader queue;

creates a record in the Action queue for the reindexing action; and updates the workcase processing statistics for the user.

The Reindex function at the team leader level displays a form that shows the old and new index values for the workcase and requests the user to accept, change, or cancel the reindexing request. If the team leader cancels the reindexing request, the function:

accepts a route reason code selected by the team leader from a pull-down list of reason codes;

appends the team leader's routing level to the selected route reason, and updates the Route Reason/Routing level field in the Team Leader queue record;

routes the workcase back to the original work queue and representative;

updates the Location queue record for the workcase; and creates an Action queue record for the cancel/re-routing action.

If the team leader accepts the new index values or enters new index values, the function performs the following tasks:

updates the appropriate index values in the indexing database for the lowest document ID in the folder;

creates a Distribution queue record for the document and sets a special flag to force the Distribution process to create a new workcase from the document;

deletes the records for the workcase from all system queues;

unfiles the workcase document(s) from the folder; and creates appropriate statistics file records for the workcase deletion and reindexing actions.

The Route function enables a user to route a workcase to another work queue. The names of the queues to which a user is permitted to route a workcase is controlled by configurable parameters in the user's Security table record. The Route function performs the following tasks:

determines the names of the queues to which a user can route a workcase;

displays a list of route reasons and accepts the user's selected route reason;

updates the appropriate field in the work queue record to indicate the route reason and the user's route level and moves the workcase to the selected queue;

deletes the record for the workcase from the originating queue;

creates a record for the workcase in the destination work queue;

updates the Location queue record to indicate the new location of the workcase; and creates an Action queue record for the routing action and updates the user's workcase processing statistics records.

The Administration Functions enable the supervisory user to maintain the contents of the application reference tables and to reassign workcases from one user to another. The Administration functions include Manager Functions. The Manager Functions enable users with supervisory-level (team leader, manager, and supervisor) privileges to perform the following functions: Reassign, Browse Queue, Document Move, Global Query, Retrieve Archives, Revise Target Date, Work Unmatch Queue, and End Work Unmatch Queue.

When the user selects the Table Maintenance icon, the Workflow form displays a list of application reference tables. After the user selects a table from the list, the function displays a form that shows the name of the data fields in each record of the selected table. The form also includes a function bar that shows the maintenance operations that can be performed on each table. Table maintenance commands include add record, change record, copy record, delete record, inquire record, display next record, display previous record, display first record, and display last record.

The Table Print function enables the user to print the contents of any or all of the imaging system database tables. The function:

displays a form that lists the names of each table;

accepts the user's table selections; and writes the contents of each selected table to an ASCII-delimited text file. A nightly batch process will then export the text file to a database application, which will perform the necessary report data formatting and printing tasks.

The Reassign function reassigns the user ID associated with selected active workcases. The function:

displays a form for the user to enter the following user ID and workcase search and reassignment data such as: old user ID, new user ID, workcase number, and all workcases;

validates the old and new user IDs against data in the Security table;

performs one of the following actions depending on whether the user enters a specific workcase number or selects the "All" option on the query form:

if the user specifies reassignment of a particular workcase number, the function changes the user ID for the workcase in the Location queue;

if the user selects to reassign all workcases for a specified user ID, the function replaces the old user ID with the new user ID for all appropriate workcases in the Location queue;

if the user omits a workcase number and leaves the "All" option disabled, the function displays a list of all workcases associated with the old user ID. The function replaces the user IDs in the Location queue for all workcases that the user selects from the list;

creates an Action queue record for each user ID reassignment; and updates the workcase processing statistics for the user.

The Browse Queue function enables the user to browse the workcases in a selected queue and to work a selected workcase. The function performs the following tasks:

reads the Queue Names table and displays a list of queues defined in the system;

displays a list of workcases in the selected queue;

displays the first document from the selected workcase and enables the user to browse documents in the folder;

enables processing on the workcase if the user selects the "Work" option from the form. In this instance, the function returns the data for the previously displayed workcase to its queue, fetches the data associated with the selected workcase, and returns the user to the main workflow processing form to enable the user to select another individual function; and exits the queried workcase and returns the user to the main workcase processing form when the user selects the "Exit/Cancel" function from the menu bar.

The Document Move function enables a user to move a document between folders, or from a folder to the Unmatch queue, or from the Unmatch queue to a folder. The function performs the following tasks:

determines the source for the document being moved—work queue or Unmatch queue;

checks whether the user is attempting to move the first document or the only document in a folder—these actions require reindexing;

checks that the user has provided a destination for the document; and checks whether the destination folder is busy and, if so, places the document in the Unmatch queue with a destination folder ID to enable placement of the document later by the File Document batch process. If the destination folder is not busy, the program files the document in the folder.

The Global Query function queries the imaging database for active workcases according to user-specified search criteria. The function performs the following tasks:

displays a form for accepting query search criteria, which includes queue name, user ID, cardholder account name, workcase type, and ranges for transaction amount, transaction posting date, and receive date;

lists the folders that match the search criteria;

displays the first document from the selected folder and enables the user to browse documents in the folder;

enables processing on the workcase if the user selects the "Work" option from the form. In this instance, the function returns the data for the previously displayed workcase to its queue, fetches the data associated with the selected workcase, and returns the user to the main workflow processing form to enable the user to select another individual function;

exits the queried workcase and returns the user to the main workcase processing form when the user selects the "Exit/Cancel" function from the menu bar; and updates the workcase processing statistics for the user.

The Retrieve Archives function locates a folder for a closed workcase and enables the user to browse the documents within the folder. The function performs the following tasks:

displays a form that accepts the following search criteria such as Folder ID number, Cardholder account number, and ranges for transaction posting date, transaction amount, and Workcase type;

displays a list of folders that meet the search criteria;

displays the first image from the selected folder. The user can browse the document images in the folder using next, previous, first, and last paging commands; and updates the workcase processing statistics for the user and returns to the main Workflow form when the user terminates the browse.

The Revise Target Date function changes a workcase's target date by adding a specified number of days to the existing target date. Parameters in the reference tables define the maximum number of days by which a given workcase's target date can be extended. The actual number of days added to a workcase's current target date depends on:

whether date calculations for the given combination of workcase type and credit union prefix are based on working days (Monday through Friday) or calendar days (Monday through Sunday), as specified in the Workcase Types reference table; and whether any dates listed in the Holidays table fall within the current system date and the revised target date; these dates are not counted when adding days to a target date.

The Revise Target Date function performs the following tasks:

displays a form that shows the current target date for the workcase and a field for entering the number of days to extend this target date;

determines whether the number of extension days represents working or calendar days, whether any of the dates in the extension period represent a holiday that should not be counted, and derives the new target date accordingly;

displays the new target date for confirmation;

updates the record for the workcase in the work queue to reflect the revised target date;

updates the Location queue record for the workcase to show the number of days the original target date was extended;

sends the workcase to the Weighting process; and updates the workcase processing statistics for the user.

The Unmatched queue contains documents with index values that match the corresponding index values of more than one workcase. The Work Unmatched Queue function informs the Workcase Presentation process that the user wishes to work from the Unmatch queue rather than from the current work queue. The Workcase Presentation process then presents the user with the document images from the Unmatch queue. The user can then process Unmatch queue records by using the Document Move function (to move the document to an existing workcase folder) or by using the Initiate Workcase from Unmatch function (to cause the creation of a new workcase from the document).

The End Work Unmatch function informs the Workcase Presentation process that the user no longer wishes to work from the Unmatch queue. The function causes the Workcase Presentation process to cease fetching documents from the Unmatch queue and to begin fetching workcases for the user from the user's designated work queue, as specified by various parameters in the database tables.

4. Batch/Background Processing

Figure 5:
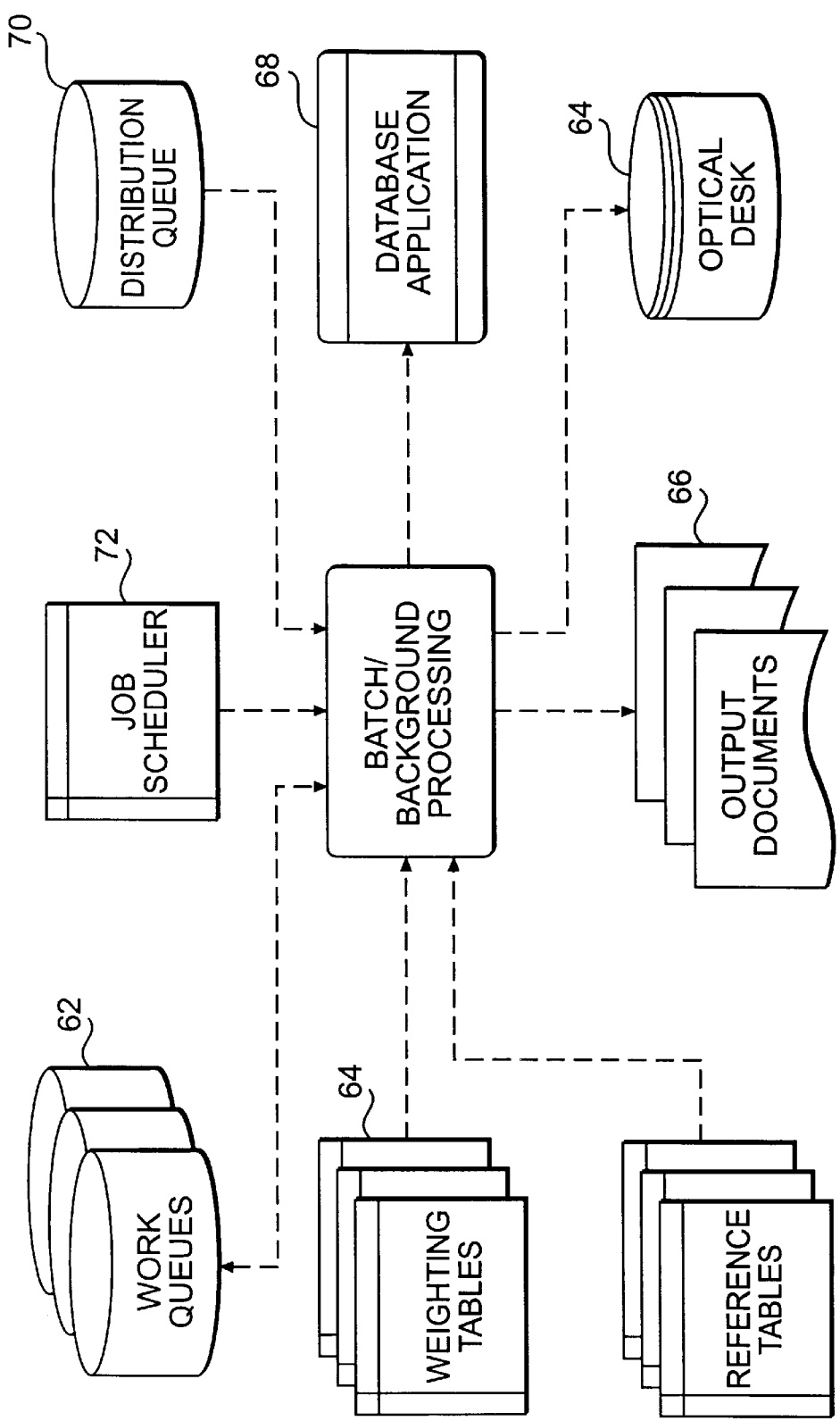
FIG. 5 shows the process required for batch/background processing of documents.

FIG. 5 shows the general data flow associated with the batch/background processes supported in the imaging system. These processes include distributing documents to work queues, weighting and prioritizing workcases, archiving closed workcases and purging aged data, creating and exporting ASCII text files to a database application for use in reports, printing documents, filing documents into folders, and pre-fetching documents. Batch/Background Processing performs the following: Action Queue Processing 72 and Purging, Cycle Printing 66, Document Distribution 70, Filing Unmatched Documents, Pre-fetch, and Workcase Weighting 64.

The workcase Presentation process runs continually upon user log-on to the Imaging and Workflow system to fetch and display workcases to the user. Once this process retrieves a workcase for the user, the user can perform any of the functions available to the user or, in the rules-based version of the application, initiate the execution of a rule on the workcase. The process performs the following tasks:

determines the identity of the user logged on to the system;

determines the functions the user is permitted to perform, based on parameters in system reference tables;

determines the work queues from which the user will process workcases and the sequence in which the user will work from the queues;

fetches workcases from the work queues according to the indicated priority scheme;

retrieves the document images associated with each fetched workcase and all data associated with the workcase;

calls the appropriate program based on the user's function selection from the menu bar or rule list (if using the rules-based version of the application); and fetches the next appropriate workcase for the user after the user completes processing on the current workcase.

The Action Queue Processing 72 and Purging process runs a part of a daily batch routine and performs the following processing on records in the Action queue:

creates a case action form for each workcase that was closed and commits the form to optical disk storage 64 and files the form in the workcase folder 62. This form contains each action performed on the workcase;

purges records for closed workcases from the Action queue 62; and purges the folders for closed workcases from the Location and Work queues 62.

Print requests for document images that the user selects to print immediately are sent directly to the print queue supplied with the FileNet system. The resident FileNet software processes these print requests—not the imaging and workflow system application of the present invention. Print requests for document images that the user selects to print in a deferred or batch mode, however, are sent to the Print Request queue. The Cycle Printing process runs as a batch process typically once a day (although it can be configured to run at any desired interval) to process records from the Print Request queue. The process performs the following tasks for each user ID referenced in the Print Request queue records:

groups all documents ordered for printing by the same user and for the same account number;

creates a cover sheet document that introduces the group of related documents;

writes the appropriate records to the FileNet print queue to first print the cover sheet, followed immediately by the specified document image reprints;

deletes the record(s) from the Print Request queue; and terminates after all eligible records have been processed.

The Export File Maker process produces various ASCII-delimited text files from statistical queue records compiled daily during workcase processing. The process builds the following text files:

scanning statistics;

indexing statistics; and workcase processing statistics.

The scanning statistics text file is built from records in the Scanning Statistics queue, which contains summary statistics for every batch scanned during the day. The indexing statistics text file is built from records in the Indexing Statistics queue, which contains summary statistics for every batch of scanned documents that were indexed during the day. The workcase processing statistics text file is built from records in the Representative Statistics queue, which contains data related to every action performed by every representative during the course of daily workcase processing. After each text file is produced, the process clears the statistics queue from which the text file was produced.

ASCII-delimited text files that are built directly during workcase processing require no translation by the Export File Maker process. The process simply ships these "ready-to-go" files to the database application.

Figure 6:
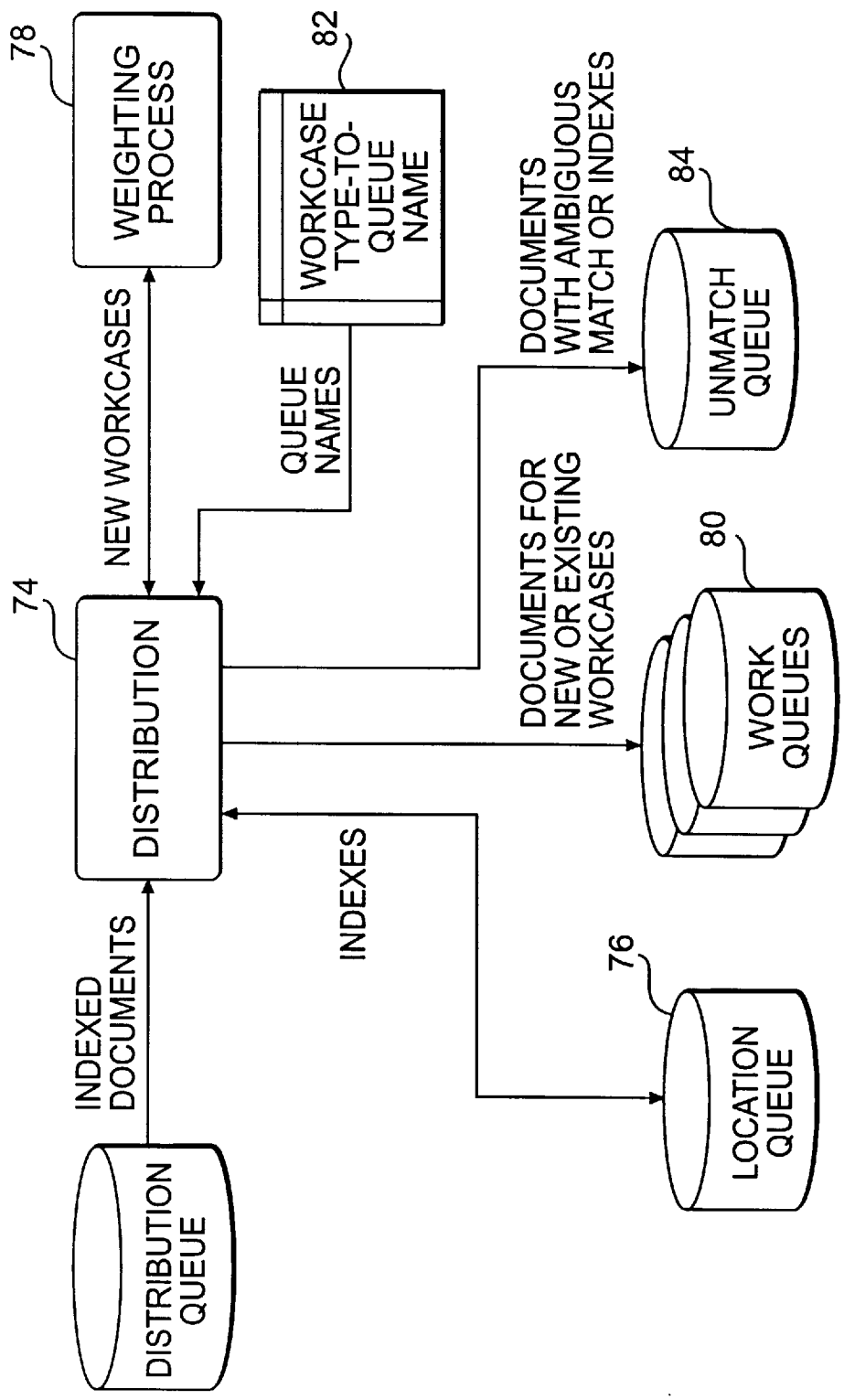
FIG. 6 shows the process and data flow for document distribution.

FIG. 6, the Document Distribution diagram, shows the process and data flow for the Document Distribution process. The Distribution process runs as a background process and distributes indexed documents to the appropriate queues. The process retrieves indexed documents from the Distribution queue 74 and compares the index values of each document in the Distribution queue against the index values associated with workcases in the Location queue 76. If the indexes for the incoming document do not match the indexes for any of the existing workcases, then the process treats the document as a new workcase and:

creates a new folder (workcase) for the document;

calls the Weighting process 78 to calculate the target date, weighting, and priority for the workcase;

routes the folder to the appropriate work queue 80, as follows:

for documents that belong to an existing workcase, the module routes the document to the folder in the queue name referenced in the Location queue record for the workcase;

for new workcases that have been weighted and prioritized by the Weighting process, the module references the Workcase Type-to-Queue Name 82 table to determine the name of the queue to which the document should be routed; and for cases where the process cannot positively determine which folder the incoming document belongs to based on the available index values, the process inserts the document into the Unmatched queue 84;

creates a record for the folder in the Location queue 76. If the indexes for the incoming document match the indexes for only one existing workcase, then the module places the incoming document into the workcase folder and clears the system delay date (F_Delay) for the workcase, and updates a flag that indicates a document was matched to the workcase.

The File Unmatched Document process attempts to file documents from the Unmatched queue 84 that specify a destination folder ID, which indicates a previous attempt to file the document failed. The process performs the following tasks:

retrieves a record from the Unmatched queue that specifies a destination folder ID for the related document; and attempts to file the document in the specified folder:
if the destination folder is busy, the process skips to the next record in the Unmatched queue. The next attempt to file the document will occur when the process runs again;
if the destination folder is not busy, the function moves the document into the folder, clears the value for F_Delay, and deletes the Unmatched queue record.

The Pre-Fetch Documents function runs as a background process to copy document images from optical disk storage into cache memory. The number and types of documents that are pre-fetched are determined by selection criteria contained in a reference table. The function runs initially upon system startup and then sleeps for the number of minutes specified in the System Parameters table. The function performs the following tasks:

reads the Pre-Fetch Parameters table for the following document selection criteria: names of queues to pre-fetch documents from the priority of each queue during pre-fetching, and the number of workcases to pre-fetch from each queue; and reads the work queues in the specified priority and retrieves from each queue the document IDs for the specified number of workcases. The function also displays a message on the system console indicating that the Pre-Fetch process is active;

copies the appropriate document images from optical disk storage to disk cache memory; and displays a message indicating process completion and sleeps for the duration specified in the System Parameters table.

The Weighting process 78 is called in three situations. In the first situation, the Weighting process is called by the Distribution process to calculate the initial target date, weight and priority for a new workcase. In the second situation, the Weighting process is called during an on-line workcase processing function, such as Revise Target Date or Reindexing, to immediately recalculate a workcase's weight and priority. In the third situation, the Weighting process is called as a daily batch process to recalculate weights and priorities for all active and pending workcases and to determine which workcases are approaching their review or target dates. The function performs the following tasks:

calculates the initial target date for the workcase if the process is called from the Distribution process by adding a specified number of working or calendar days to the Receive Date for the workcase: a) reads the Target Dates table for the combination of workcase type and credit union prefix to get the number of days to add to the Receive Date of the workcase; b) reads the Workcase Types table to determine whether the number of days to add represent working or calendar days or both and calculates the Original Target Date; c) reads the Holidays table to determine whether a holiday occurs during the period from the Receive Date to the Original Target Date and adjusts the Target Date if required; d) Returns the Original Target Date to the calling process;

calculates the weighting and priority values for each workcase, as follows:
reads the weighting reference tables to retrieve the individual weighting factors associated with the workcase type and credit union prefix combination. These weighting factors are weight by Fax, weight by Post Date, weight by Transaction Amount, weight by Workcase Type, weight by Days Until Target Date, weight by Days Until Review Date; and weight by Number of Days Unassigned;
sums the individual weighting factors and reads the Weight-to-Priority table to determine the priority associated with the total weighting factor;
returns the weight and priority values to the calling process.

The Approaching Target Report File Create process checks each record in each work queue and performs the following tasks:

for each record that indicates the workcase is within a specified number of days of its target date, the process writes a record to the Approaching Target Date file;

for each record that indicates the workcase is either past its review date or its target date, the process writes a record to the Past Target/Past Review file. Both files are ASCII-delimited text files that a nightly batch process exports to a database application.

Preferred and alternate embodiments of the present invention have now been described in detail. It is to be noted, however, that this description of these specific embodiments is merely illustrative of the principles underlying the inventive concept. It is therefore, contemplated that various modifications of the disclosed embodiments will, without departing from the spirit and scope of the invention, be apparent to persons of ordinary skill in the art.

I claim:

1. A new method for performing imaging and workflow processing in a computer network comprising:

classifying and grouping similar workeases into a batch, each workcase comprising a plurality of documents;

attaching a header sheet comprising information identifying a workcase batch, the workcase batch comprising a plurality of workcases;

scanning the workcase batch, using a scanner, to create a digital record of the workcase batch;

assigning indexes to each scanned document to allow linking of each document to a workcase;

performing rule-based workcase processing of the scanned batch of workeases;

performing batch/background processing of the workcases comprising;

weighting workcases, the weighting comprising calculating an initial target date, weight, and priority recalculating a workcase's weight and priority recalculating all weights and priorities of all active and pending workcases on a daily basis.

2. The method of claim 1 wherein scanning further comprises:

entering information about the workcase;

accepting the entered information about the workcase batch;

validating the entered information about the workcase batch;

feeding the workcase batch documents through the scanner; verifying that the number of scanned documents matches a value entered for the number of pares in the batch;

accepting the scanned documents if the number of scanned documents matches a value entered for the number of pages in the batch;

rejecting the scanned documents if the number of scanned documents does not match the value entered for the number of pages in the batch; and placing the digital record of the scanned documents into a scan queue.

3. The method of claim 1, wherein indexing further comprises:

logging onto the system;

displaying the first document in the first batch of documents from the scan queue;

entering workcase information into the application;

copying the entered information into the required locations;

prompting an user to enter workcase information for verification; and creating records in the database based on information entered and indicators set.

4. The method of claim 3, wherein indexing further comprises:

rejecting an unacceptable image of a scalded document;

browsing to view additional pages in the displayed document;

ending the indexing process including updating index statistics file records, storing the workcase and saving the workcase;

ending the indexing process on a document that is associated with multiple sets of index values;

ending the indexing process on a document that is associated with more than one instance of the same type of workcase or several different workcase types for the same account; and exiting the indexing session.

5. The method of claim 1, wherein workcase processing further comprises:

logging onto the system;

determining which workcase to present to the user;

displaying workcases to user;

performing rules-based processing on workcases according to predefined rules and initiating other application processes depending on the actions performed on a workcase; and restarting rules-based processing on workcases following an interruption in processing.

6. The method of claim 5, wherein workcase processing further comprises:

browsing within the folder for the displayed workcase;

closing a workcase;

exiting the workcase window to terminate all open communication sessions and return the user to the application;

creating a document to include in the workcase folder;

accessing other PC based applications on the network;

pending a workcase;

requesting a document to be printed;

requesting a document to be faxed;

searching the work queue for an active workcase;

changing the index values for a workcase;

computing and maintaining a pend date for a workcase;

routing a workcase to another user level as permitted by the user's routing privileges;

maintaining the application's reference table;

reassigning workcases;

browsing the workcases in a selected queue and to work a selected workcase;

moving documents from one folder to another;

querying the imaging database for active workcases according to user-specified search criteria;

locating a folder for a closed workcase and enabling the user to browse the documents within the folder;

revising a workcase's target date by adding a specified number of days to the existing target date; and assigning documents, with index values that match the corresponding index values of more than one workeases, to existing workcases or to new workcases.

7. The method of claim 1, wherein batch/background processing further comprises:

archiving data for closed workcases to storage means;

placing selected workcases into a quality assurance queue for review;

deleting data for closed workcases;

filing unmatched documents;

weighting and computing priorities for workcases;

processing print queue requests for printing documents;

processing fax queue requests for faxing documents;

distributing indexed documents to appropriate queues; and fetching workcase documents.

8. The method of claim 7, wherein distributing indexed documents to the appropriate queues further comprises:

comparing index values of each document in the distribution queue to documents in the location queue;

creating a new folder for an unmatched document;

calculating the target date, weighting, and priority for the new folder;

routing the folder to the appropriate work queue;

filing the unmatched documents; and copying documents from optical storage into cache memory.

9. The method of claim 8, wherein weighting and prioritizing documents further comprises:

calculating the initial target date, weight and priority for a new workcase;

recalculating an existing workcase's weight and priority;

recalculating weights and priorities for all active and pending workcases; and recalculating weights and priorities for workcases to determine which workcases are approaching their review or target dates.

10. A system for providing imaging and workflow processing on a computer network comprising;

a computer network;

a CPU connected to the network;

storage and memory connected to the CPU for storing software modules;

at least one scanner connected to the CPU for scanning documents;

communication means connected to the CPU for communicating with users;

at least one display connected to the CPU for displaying reports created by the system;

output means for printing and faxing output;

the software modules stored in the storage and memory comprising;

a scanning module;

an indexing module;

a workcase module;

a table processing module;

a batch/background processing modules;

and, wherein the batch/background modules further comprise logic for workcase weighting comprising calculating an initial target date, weight and priority, recalculating a workcase weight, and recalculating all weights and priorities of all active and pending workcases on a daily basis.

11. The system of claim 10, wherein the workcase processing module, further comprises logic for changing and adding parameterized table structures referenced by the system stored in the system storage and memory.

12. The system of claim 10, wherein the workcase processing module further comprises logic for accessing special processing support modules and utilities routines stored in the system storage and memory.

13. The system of claim 10, wherein the batch/background processing module further comprises logic for weighting and prioritizing workcases in work queues stored in the system storage and memory.

14. The system of claim 10, wherein the batch/background processing module further comparing logic for archiving closed workcases stored in the system storage add memory.

15. The system of claim 10, wherein the batch/background processing module further comprises logic for purging data for closed workcases from queues stored in the system storage and memory.

16. The system of claim 10, wherein the batch/background processing module further comprises logic for exporting data to a database application for use in creating management reports.

* * * * *